(12) United States Patent
Bejar et al.

(10) Patent No.: US 7,392,187 B2
(45) Date of Patent: Jun. 24, 2008

(54) METHOD AND SYSTEM FOR THE AUTOMATIC GENERATION OF SPEECH FEATURES FOR SCORING HIGH ENTROPY SPEECH

(75) Inventors: Isaac Bejar, Hamilton, NJ (US); Klaus Zechner, Princeton, NJ (US)

(73) Assignee: Educational Testing Service, Princeton, NJ (US)

( * ) Notice: Subject to any disclaimer, the term of this patent is extended or adjusted under 35 U.S.C. 154(b) by 278 days.

(21) Appl. No.: 10/945,150

(22) Filed: Sep. 20, 2004

(65) Prior Publication Data

US 2006/0074655 A1   Apr. 6, 2006

(51) Int. Cl.
*G10L 15/00* (2006.01)
(52) U.S. Cl. ...................................................... 704/243
(58) Field of Classification Search ................. 704/243, 704/723; 434/156
See application file for complete search history.

(56) References Cited

U.S. PATENT DOCUMENTS

| | | | | |
|---|---|---|---|---|
| 4,377,158 | A * | 3/1983 | Friedman et al. | 128/897 |
| 6,055,498 | A * | 4/2000 | Neumeyer et al. | 704/246 |
| 6,078,885 | A * | 6/2000 | Beutnagel | 704/258 |
| 6,205,424 | B1 * | 3/2001 | Goldenthal et al. | 704/247 |
| 6,317,712 | B1 * | 11/2001 | Kao et al. | 704/256.3 |
| 6,609,094 | B1 * | 8/2003 | Basu et al. | 704/240 |
| 6,711,541 | B1 * | 3/2004 | Kuhn et al. | 704/242 |
| 6,754,626 | B2 * | 6/2004 | Epstein | 704/235 |
| 7,010,486 | B2 * | 3/2006 | Peters | 704/255 |
| 7,016,829 | B2 * | 3/2006 | Brill et al. | 704/9 |
| 2003/0200086 | A1 * | 10/2003 | Kawazoe et al. | 704/239 |
| 2004/0006461 | A1 * | 1/2004 | Gupta et al. | 704/200 |
| 2005/0119885 | A1 * | 6/2005 | Axelrod et al. | 704/231 |

OTHER PUBLICATIONS

Breitfelder et al., The Authoritative Dictionary of IEEE Standards Terms 2000, IEEE Press, Seventh Edition, p. 721.*
Educational Testing Service (2002a) *LanguEdge Course: Score Interpretation Guide*; Princeton, NJ.
Educational Testing Service (2002b) *LanguEdge Course: Handbook for scoring speaking and writing*; Princeton, NJ.
Bilmes, J., et al.; *Graphical Models and Automatic Speech Recognition* in "Mathematical Foundations of Speech and Language Processing", Institute of Mathematical Analysis; Volumes in Mathematics Series; Springer-Verlag, 2003.
Breiman, et al..

(Continued)

*Primary Examiner*—David Hudspeth
*Assistant Examiner*—Josiah Hernandez
(74) *Attorney, Agent, or Firm*—Mayer Brown LLP

(57) ABSTRACT

A method and system for automatically generating a scoring model for scoring a speech sample are disclosed. One or more training speech samples are received in response to a prompt. One or more speech features are determined for each of the training speech samples. A scoring model is then generated based on the speech features. At least one of the training speech samples may be a high entropy speech sample. An evaluation speech sample is received and a score is assigned to the evaluation speech sample using the scoring model. The evaluation speech sample may be a high entropy speech sample.

2 Claims, 2 Drawing Sheets

OTHER PUBLICATIONS

Butler, Eignor, et al.; *TOEFL 2000 Speaking Framework: A Working Paper*, Educational Testing Service, Princeton, NJ; vol. 38.

Challoub-Deville, M.; *Language Testing and Technology: past and future*; Language Learning & Technology; 5(2): 95-98.

Jurafsky, D. et al., *Speech and Language Processing: An Introduction to Natural Language Processing, Computational Linguistics, and Speech Recognition*, Prentice Hall Series in Artificial Intelligence, 2000.

* cited by examiner

METHOD AND SYSTEM FOR THE AUTOMATIC GENERATION OF SPEECH FEATURES FOR SCORING HIGH ENTROPY SPEECH

TECHNICAL FIELD

The present invention relates generally to the field of speech recognition and assessment. Specifically, the invention relates to scoring and assigning a score to speaking performances in an automated fashion by computing features characterizing non-native speech based on the output of a speech recognition engine. The method and system improve the evaluation of speech samples of non-native speakers, although they are applicable to any speech sample. The method further permits the assessment of responses comprising spontaneous (high entropy) speech as well as responses that can be anticipated.

BACKGROUND

The increasing availability and performance of computer-based testing has greatly increased the feasibility of assessing language proficiency. However, doubts regarding the feasibility of assessing speaking proficiency remain. Recognizing the speech of language learners is particularly difficult because language learners may struggle to articulate their thoughts and can exhibit highly accented speech. Moreover, speech recognition alone is insufficient to characterize speaking proficiency of language learners from a communicative prospective. In other words, the characterization of speaking proficiency requires more than adequate comprehensibility of the speech. The content and qualitative aspects of the speech can be important in the evaluation of speaking proficiency from a communicative perspective.

Available computerized speaking assessment systems have not adequately elicited the full range of individual and interactive speaking performances in which language educators are interested. In addition, such technologies have not captured the complexities of such performances and the inferences that human evaluators make about them. Accordingly, in order to fully characterize speaking proficiency, task design (the nature of the test question), evidence identification (scoring) and evidence aggregation (psychometric modeling) need to be closely coordinated. Collectively, these three processes and related principles constitute the elements of assessment design.

Task design typically occurs during a test development phase. For example, in an evidence centered design context items are explicitly designed to elicit the evidence called for by the goals of the assessment, such as assessing speaking proficiency from a communicative perspective. Importantly, the process does not occur until the evidentiary implications of the goals of the assessment are well understood. Computer-based delivery of speaking proficiency has been criticized as a hindrance to eliciting such evidence because of limitations in the types of questions that are presented and responses that are elicited.

Assuming that the design of computer-deliverable tasks that appropriately elicit evidence called for in an assessment of speaking proficiency is possible, the appropriate scoring of such tasks is still required. Current systems have not adequately developed automated procedures for identifying evidence of speaking proficiency in cases where the content of responses cannot be reasonably anticipated (i.e., spontaneous or high entropy speech). Finally, psychometric models are needed to aggregate responses to several prompts and update the current estimate of speaking proficiency.

In recent years, significant advances in automatic speech recognition (ASR) systems have occurred. In particular, speaking proficiency systems exist that can automatically score tasks in which response patterns can be anticipated. For example, such tasks include responding orally to questions that have a single anticipated response.

While a novice level of proficiency (such as pronunciation evaluation and training) can be measured using tasks that elicit the limited range of speech required by calling for anticipated responses, higher levels of proficiency can only be tested by tasks that measure responses requiring spontaneity and adaptability to unique situations. For example, in addition to pronunciation evaluation, higher levels of proficiency can require determinations of speech content and qualitative characteristics of speech, such as intonation or other prosodic features.

Moreover, automated recognition of speech from language learners is particularly challenging because such individuals are generally less proficient with the language and can have highly accented speech. A further complexity is that merely recognizing speech is not sufficient to characterize speaking proficiency. For example, prosodic characterizations of speech samples, such as intonation, are also required. Current systems for assessing speaking proficiency do not include the ability to perform such measurements while being able to recognize spontaneous speech.

What is needed is a system and method for analyzing and scoring spontaneous (high entropy) speech.

A need exists for an automatic system and method for determining the speaking proficiency of language learners.

A further need exists for applying assessment design principles to develop an automated system for scoring speaking proficiency based on tasks that are not limited to anticipated responses.

The present disclosure is directed to solving one or more of the above-listed problems.

SUMMARY

Before the present methods, systems and materials are described, it is to be understood that this invention is not limited to the particular methodologies, systems and materials described, as these may vary. It is also to be understood that the terminology used in the description is for the purpose of describing the particular versions or embodiments only, and is not intended to limit the scope of the invention which will be limited only by the appended claims.

It must also be noted that as used herein and in the appended claims, the singular forms "a," "an," and "the" include plural references unless the context clearly dictates otherwise. Thus, for example, reference to a "speech sample" is a reference to one or more speech samples and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described. All publications mentioned herein are incorporated by reference. Nothing herein is to be construed as an admission that the invention is not entitled to antedate such disclosure by virtue of prior invention.

A method of automatically generating a scoring model for scoring a speech sample includes receiving one or more training speech samples in response to a prompt, determining one or more speech features for each of the training speech samples, and generating a scoring model based on the speech features. The scoring model is effective for scoring high entropy evaluation speech responses. At least one of the training speech samples may include a high entropy speech sample. The one or more speech features may include one or more of the following for each training speech sample: a previously assigned score, a lexical count, a fluency measure, a rate of speech measure, a lexical similarity measure, and a speech sample utterance duration.

The previously assigned score may include a score assigned by a human rater characterizing a speaking proficiency of the training speech sample. The lexical count may include one or more of the following: a number of utterances in response to a prompt for the training speech sample, a number of words used in the training speech sample, a number of disfluencies used in the training speech sample, a number of tokens used in the training speech sample, where the number of tokens includes a sum of the number of words and the number of disfluencies, a number of unique word forms used in the training speech sample, and a ratio equal to the number of unique word forms used in the training speech sample divided by the number of tokens used in the training speech sample. The fluency measure comprises one or more of the following: a number of silent periods, each having a duration, during the training speech sample, a ratio equal to the number of silent periods during the training speech sample divided by a number of words used in the training speech sample, a mean of the durations for all silent periods during the training speech sample, and a standard deviation of the durations of all silent periods during the training speech sample. The rate of speech measure may include one or more of the following: a number of words per time unit in the training speech sample, a number of disfluencies per time unit in the training speech sample, a number of unique word forms per time unit in the training speech sample, and a number of silent periods per time unit in the training speech sample. The lexical similarity measure may include one or more of the following: an inner product of word frequencies for the training speech sample and a content vector, where the content vector includes raw frequencies of word forms based on a corpus related to the prompt, and a ratio equal to the inner product divided by a number of words in the training speech sample.

In an embodiment, generating a scoring model includes generating a classification tree based on a regression, for each training speech sample, between a score assigned to the training speech sample and the one or more speech features determined for the training speech sample. In an alternate embodiment, generating a scoring model includes generating a scoring model based on weighting factors for the one or more speech features assigned by one or more expert judges.

In an embodiment, the method further includes receiving an evaluation speech response, and assigning a score to the evaluation speech response using the scoring model. The evaluation speech response may include a high entropy speech sample.

In an embodiment, a method for scoring a high entropy speech sample includes retrieving a scoring model based on one or more speech features, and assigning a score to a high entropy speech sample using the scoring model. The one or more speech features may include one or more of the following for each high entropy speech sample: a previously assigned score, a lexical count, a fluency measure, a rate of speech measure, a lexical similarity measure, and a speech sample utterance duration.

The previously assigned score may include a score assigned by a human rater characterizing a speaking proficiency of the high entropy speech sample. The lexical count may include one or more of the following: a number of utterances in response to a prompt for the high entropy speech sample, a number of words used in the high entropy speech sample, a number of disfluencies used in the high entropy speech sample, a number of tokens used in the high entropy speech sample, where the number of tokens comprises a sum of the number of words and the number of disfluencies; a number of words used in the high entropy speech sample, and a ratio equal to the number of unique word forms used in the high entropy speech sample divided by the number of tokens used in the high entropy speech sample. The fluency measure may include one or more of the following: a number of silent periods during the high entropy speech sample, wherein each silent period comprises a duration, a ratio equal to the number of silent periods during the high entropy speech sample divided by a number of words used in the high entropy speech sample, a mean of the durations for all silent periods during the high entropy speech sample, and a standard deviation of the durations of all silent periods during the high entropy speech sample. The rate of speech measure may include one or more of the following: a number of words per time unit in the high entropy speech sample, a number of disfluencies per time unit in the high entropy speech sample, a number of unique word forms per time unit in the high entropy speech sample, and a number of silent periods per time unit in the high entropy speech sample. The lexical similarity measure may include one or more of the following: an inner product of word frequencies for the high entropy speech sample and a content vector, where the content vector includes raw frequencies of word forms based on a corpus related to the prompt, and a ratio equal to the inner product divided by a number of words in the high entropy speech sample.

In an embodiment, a system for automatically generating a scoring model for scoring a high entropy speech sample includes a processor, and a processor-readable storage medium. The processor-readable storage medium contains one or more programming instructions for performing a method for automatically generating a scoring model for scoring a high entropy speech sample including receiving one or more high entropy training speech samples in response to a prompt, determining one or more speech features for each of the high entropy training speech samples, and generating a scoring model based on the speech features. The processor-readable storage medium may further contain one or more programming instructions for performing the following: receiving a high entropy evaluation speech sample, and assigning a score to the high entropy evaluation speech sample using the scoring model.

In an embodiment, a system for scoring a high entropy speech sample includes a processor, and a processor-readable storage medium. The processor-readable storage medium may contain one or more programming instructions for performing a method for scoring a high entropy speech sample including retrieving a scoring model based on one or more speech features, and assigning a score to a high entropy speech sample using the scoring model.

BRIEF DESCRIPTION OF THE DRAWINGS

The accompanying drawings, which are incorporated in and form a part of the specification, illustrate various embodiments and, together with the description, serve to explain the principles of the various embodiments.

DETAILED DESCRIPTION

Figure 1:
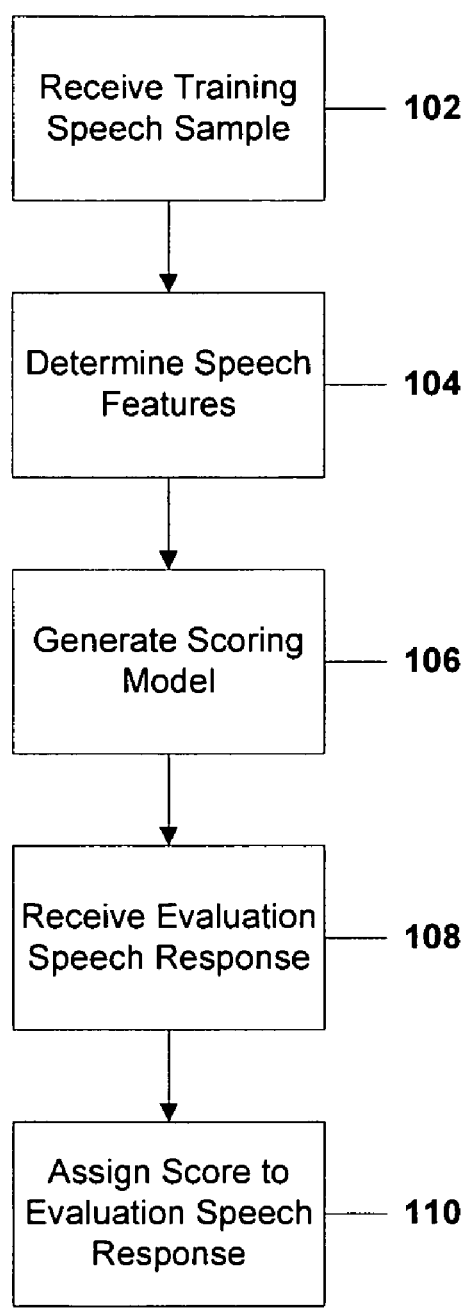
FIG. 1 depicts a flowchart of an exemplary method of generating speech features for use in a scoring model according to an embodiment.

A speech recognition and grading system may include an automatic speech recognition (ASR) system and an automatic speech grading system according to an embodiment. The ASR system may receive acoustic signals in digital form and output the most likely sequence of words corresponds to the acoustic input signals.

The ASR system may include an acoustic model for associating probabilities with "speech units" (or "phones") that represent a given phoneme. Initially, the acoustic input signals are subdivided into, for example, 10 ms intervals. Spectral features, a vector of the most essential acoustic characteristics of a frame of speech, are extracted for each interval (or "frame"). The features are transmitted to a statistical model to associate probabilities ("phone likelihoods") of each possible phone for that frame.

In an embodiment, Hidden Markov Models (HMMs) may be used to represent each phone (or a set of phone sequences, such as triphones or quinphones). Thus, each entry in a lexicon containing words recognized by the ASR system is represented by a sequence of HMMs for phones pertaining to that entry. Pronunciation variations (i.e., different sequences of phones) for a particular entry may result in multiple entries for a word in the acoustic model.

The ASR system may further include a language model, which encodes prior information for the words that are received by the acoustic model. The language model may take the form of frequency distributions for single words, pairs of words (bigrams) and triples of words (trigrams).

The language model, the acoustic model and the lexicon, which contains the normative information on the pronunciation of words in the language model, are used jointly to decode the acoustic input signal. The process then searches alternative transcriptions of the signal to locate the most likely transcription. Determining the most likely transcription is computationally intensive because the beginning and end of words are difficult to determine. Accordingly, alternative possibilities are examined to provide a ranked list of possible transcriptions of the acoustic input signals.

Symbolically, a fundamental equation of speech recognition is an application of Bayes' theorem:

$$\underset{W}{\operatorname{argmax}} P(W \mid S) = \frac{P(S \mid W)P(W)}{P(S)},$$

which simplifies to $$\underset{W}{\operatorname{argmax}} P(W|S) = P(S|W)P(W)$$

since P(S), the probability of the signal, is constant within the recognition task. P(S|W) is the "acoustic model" and computes the likelihood of the signal, S. P(W) is the "language model" and encodes the prior probability of observing the sequence of words. P(W|S) is the posterior distribution of the transcription.

The transcription for a given signal having the highest posterior probability is selected as the transcription of the signal. In other words, the most likely transcription of the signal is the sequence of words, W*, among the several possible such sequences, that maximizes the product of the likelihood that the signal was produced by a sequence of words and the probability of that sequence of words. Under this statistical approach, speech recognition is reduced to designing and estimating appropriate acoustic and language models, and finding an acceptable decoding strategy for determining W*.

Before an ASR system can recognize speech, the language model and acoustic model may be estimated and trained to provide the required information for the above-listed equations. For the acoustic model, this may include transcribing a speech sample and pairing the acoustic and textual representations. The size of the sample and the conditions under which the sample was collected may affect the training process. For the language model, the training process may include estimating the probability of observing a particular n-gram. The language model may estimate the probability by tabulating the frequency of n-grams in a relevant corpus.

Once an ASR system has been adapted for the recognition of speech by language learners or other speakers, recognition accuracy can be quantified. Recognition error rates may include word error rate and mean word accuracy (Wacmn). Each of these error rates may measure recognition performance in order to characterize the accuracy of the speech engine with respect to the speech samples. Each error rate computation may require the alignment of a transcribed speech sample (a human transcript) and the output of the ASR system (a hypothesize transcript). An optimization algorithm may be used to resolve the differences between the two transcripts in terms of insertions (I), deletions (D), and substitutions (S). Word error rate may be defined as $(S+D+I)/(1+S+D+I)$. Mean word accuracy attempts to characterize the recognition performance by equally weighing the human and hypothesized transcripts. Wacmn may be defined as $0.5*[(C/C+D+S)+C/(C+I+S)]$.

The output of the ASR system may include a digitized representation of a word and a time stamp for each word recognized from the acoustic input signals. The output of the ASR system may be transmitted to the automatic speech grading system. As shown in FIG. 1, training speech samples may first be received 102 by the automatic speech grading system. A training speech sample may have known characteristics that are used to tune the automatic speech grading system. The automatic speech grading system may grade the received digitized representation by determining 104 a plurality of speech features related to speaking proficiency. Such factors may include phonological factors, such as intonation, rate of speech and fluidity of speech; syntactic features; vocabulary; oral genres and/or knowledge of how to use oral genres appropriately; and speech acts.

A distinction is made between feature extraction and feature aggregation. Feature extraction refers to the computation of low-level characterizations of speech based on a specific speech recognition engine as applied to each spoken response. At a minimum, the engine produces an ordered list of words for each spoken response with its time stamp. Additional data may also enable computation of prosodic features, stress, etc., that, in turn, allow the computation of higher order features, such as speech acts.

Features may then be aggregated, for example, to generate 106 a scoring model. Feature aggregation may be performed on a speech sample basis or a corpus basis. The scoring model may then receive 108 evaluation speech responses and to assign 110 a score to the evaluation speech response.

In an embodiment, the scoring model determines scores by using classification or regression techniques where scores that have been independently obtained from trained raters serve as the basis for calibrating and validating the classification or regression process. Specifically, the scores provided by trained raters serve as the dependent variable and the features extracted for each training speech sample are the independent variables. Once the regression or classification system has been calibrated and validated, it may be used to assign scores 110 to evaluation speech responses based only on the features. Once the classification tree has been trained, speech samples that were not used in training may be scored in order to determine the efficacy of the classification tree. The performance of the classification tree may be rated based on its scoring of evaluation speech responses as compared to human rater scores for the same responses.

In an alternate embodiment, an assessment designer defines a score as a combination of features in order to weigh aspects of performance that are more or less valued for a specific assessment in a suitable fashion. Here, the grading system need not be "trained." Rather, scores assigned 110 to evaluation speech responses may be validated as is customary for any assessment, including perhaps, comparing the automated scores with scores provided by trained experts. The scores from the trained experts may provide external validation criteria rather than the means for defining the automated score.

Several features may be identified to assist in determining a score for a spontaneous speech sample. Such features may include, without limitation, lexical counts, fluency measures, rate of speech measures, lexical similarity measures and/or the duration of all utterances in a speech sample (Segdur).

The lexical counts may include the number of utterances (Numutt), the number of word forms (Numwrd), the number of disfluencies (Numdff), the number of tokens (Numtok), the number of unique word forms (Types), and the average number of times a word form is repeated (Ttratio). An utterance is an uninterrupted segment of speech. In other words, it is uninterrupted speech preceded and followed by silence. A word form includes all word forms (e.g., "house" and "houses" are different word forms) found in a pronunciation dictionary or database. A disfluency is an interruption of speech by a class of paralinguistic phenomena (such as "uh," "um," etc.). Numtok equals the sum of Numwrd and Numdff. Ttratio equals Types divided by Numtok.

Fluency measures may characterize the fluency of speech for speech samples. Such measures include the number of silences (Numsil), the number of silences per word (Silpwd), the average duration of silences (Silmean), and the standard deviation of silence durations (Silstddv). A silence is an acoustic event that has no discernible phonetic content and can be of variable length. Numsil may include the number of such events in a speech sample excluding silences between utterances. Silpwd equals Numsil divided by Numwrd. Silmean may be measured in seconds.

Rate measures may characterize the rate of speech for speech samples. Such measures may include the number of words per second (Wpsec), which is equal to Numwrd divided by Segdur; the number of disfluencies per second (Dpsec), which is equal to Numdff divided by Segdur; the number of unique word forms per second (Tpsec), which is equal to Types divided by Segdur; and the number of silences per second (Silpsec), which is equal to Numsil divided by Segdur.

Lexical similarity measures may characterize the lexical similarity of a transcript to a corpus. The frequency of word forms in the corpus is obtained. The resulting word frequencies may be called reference content vectors. The similarity of a speech sample may be determined by obtaining a corresponding sample content vector from the speech sample. The sample content vector may be obtained by tabulating the frequencies of word forms from the speech sample. Lexical similarity measures may include an inner product of a speech sample and reference content vectors (Cvfull). A reference content vector may include the raw frequency of word forms across a speech sample for a given prompt in the corpus. The speech sample content vector may include the raw frequency of word forms for a given speech sample. A second lexical similarity measure may be the ratio of Cvfull divided by Numwrd.

In an embodiment, prosodic information may be used in generating a scoring model. Basic prosodic features, such as duration, power and pitch, may be extracted from a speech sample.

Duration is the time (in seconds) of a speech or linguistic phenomenon, such as a word, a syllable or a phone. Duration may be determined from the ASR output. Power is the spectral energy for a time period, such as a time period including a word or a phone. Pitch is the fundamental frequency in a given time period. Pitch may only be determinable for vowels and voiced consonants. Power and pitch may be computed by examining the spectrum for a period of time.

The basic prosodic features may be combined to produce higher-level prosodic features, such as stress and intonation. Additional features may also be used to determine the higher-level prosodic features. Stress may include a speaker's emphasis on a particular syllable or word. Intonation may include falling, rising, steady high or neutral values. While each of stress and intonation may be determined using all basic prosodic features, pitch is the most influential feature for intonation. The higher-level prosodic features may be further used to compute even more complex features such as rhythm or phrasal intonation.

Figure 2:
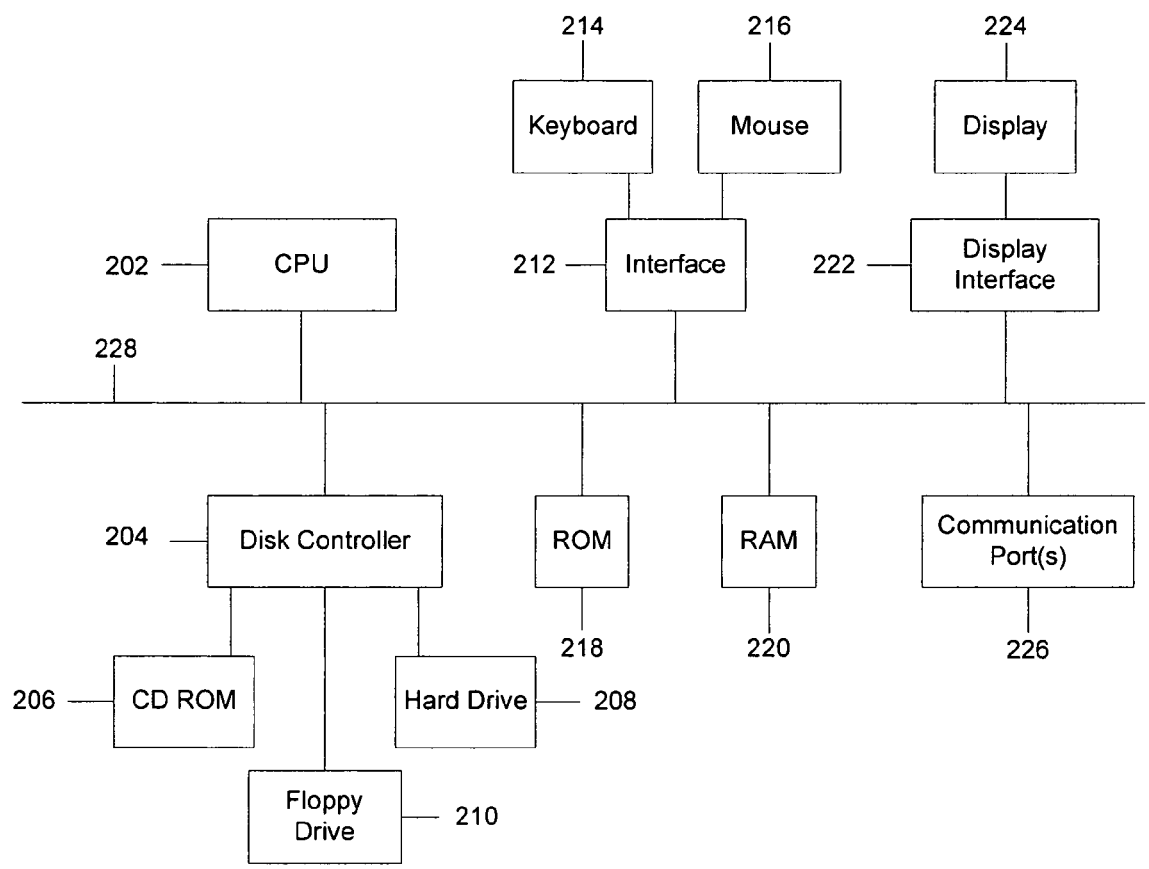
FIG. 2 is a block diagram of exemplary internal hardware that may be used to contain or implement the program instructions of a system embodiment.

FIG. 2 is a block diagram of exemplary internal hardware that may be used to contain or implement the program instructions of a system embodiment. Referring to FIG. 2, a bus 228 serves as the main information highway interconnecting the other illustrated components of the hardware. CPU 202 is the central processing unit of the system, performing calculations and logic operations required to execute a program. Read only memory (ROM) 218 and random access memory (RAM) 220 constitute exemplary memory devices.

A disk controller 204 interfaces with one or more optional disk drives to the system bus 228. These disk drives may be external or internal floppy disk drives such as 210, CD ROM drives 206, or external or internal hard drives 208. As indicated previously, these various disk drives and disk controllers are optional devices.

Program instructions may be stored in the ROM 218 and/or the RAM 220. Optionally, program instructions may be stored on a computer readable medium such as a floppy disk or a digital disk or other recording medium, a communications signal or a carrier wave.

An optional display interface 222 may permit information from the bus 228 to be displayed on the display 224 in audio, graphic or alphanumeric format. Communication with external devices may optionally occur using various communication ports 226. An exemplary communication port 226 may be attached to a communications network, such as the Internet or an intranet.

In addition to the standard computer-type components, the hardware may also include an interface 212 which allows for receipt of data from input devices such as a keyboard 214 or other input device 216 such as a remote control, pointer and/or joystick.

An embedded system may optionally be used to perform one, some or all of the operations of the present invention. Likewise, a multiprocessor system may optionally be used to perform one, some or all of the operations of the present invention.

It is to be understood that the invention is not limited in its application to the details of construction and to the arrangements of the components set forth in this description or illustrated in the drawings. The invention is capable of other embodiments and of being practiced and carried out in various ways. Hence, it is to be understood that the phraseology and terminology employed herein are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

What is claimed is:

1. A method of automatically generating a scoring model for scoring a speech sample, the method comprising:
   receiving one or more training samples in response to a prompt;
   determining one or more speech features for each of the training speech samples, wherein the one or more speech features comprise one or more of the following for each training speech sample:
   a previously assigned score,
   a lexical count,
   a fluency measure,
   a rate of speech measure,
   a lexical similarity measure comprising one or more of
      an inner product of word frequencies for the training speech sample and a content vector, wherein the content vector comprises raw frequencies of word forms based on a corpus related to the prompt, and a ratio equal to the inner product divided by a number of words in the training speech sample, and
   a speech sample utterance duration; and
   generating a scorn model based on the speech features, wherein the scoring model is effective for scoring high entropy evaluation speech responses.

2. A method for scoring a high entropy speech sample, the method comprising:
   retrieving a scoring model based on one or more speech features, wherein the one or more speech features comprise one or more of the following for each high entropy speech sample:
   a previously assigned score,
   a lexical count,
   a fluency measure,
   a rate of speech measure,
   a lexical similarity measure comprising one or more of
      an inner product of word frequencies for the high entropy speech sample and a content vector, wherein the content vector comprises raw frequencies of word forms based on a corpus related to the prompt, and
      a ratio equal to the inner product divided by a number of words in the high entropy speech sample, and
   a speech sample utterance duration; and
   assigning a score to a high entropy speech sample using the scoring model.

* * * * *

UNITED STATES PATENT AND TRADEMARK OFFICE
CERTIFICATE OF CORRECTION

| | |
|---|---|
| PATENT NO. | : 7,392,187 B2 |
| APPLICATION NO. | : 10/945150 |
| DATED | : June 24, 2008 |
| INVENTOR(S) | : Isaac Bejar and Klaus Zechner |

It is certified that error appears in the above-identified patent and that said Letters Patent is hereby corrected as shown below:

Claim 1, line 12, "scorn" should be changed to --scoring--.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,392,187 B2
APPLICATION NO. : 10/945150
DATED : June 24, 2008
INVENTOR(S) : Isaac Bejar and Klaus Zechner It is certified that error appears in the above-identified patent and that said Letters Patent is hereby corrected as shown below:

Claim 1, Column 10, line 12, "scorn" should be changed to --scoring--.

This certificate supersedes the Certificate of Correction issued August 10, 2010.

Signed and Sealed this

Thirty-first Day of August, 2010

David J. Kappos
*Director of the United States Patent and Trademark Office*